Figure 1:
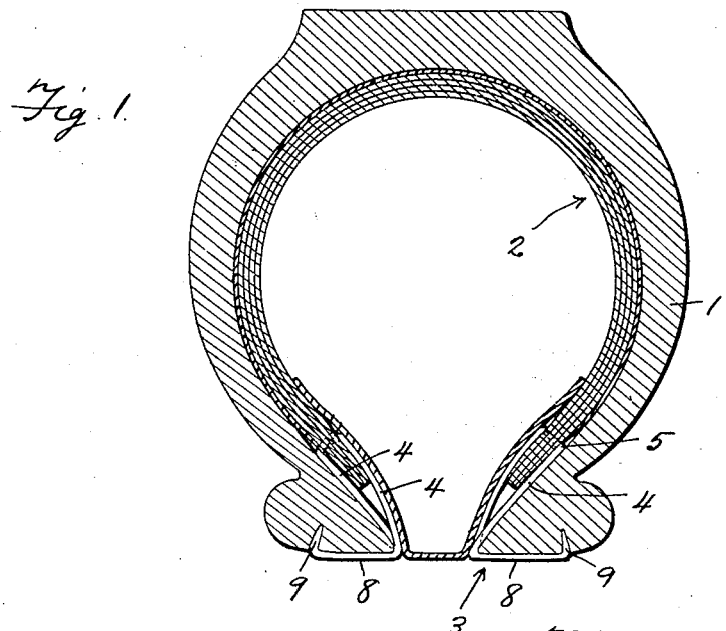

Jan. 3, 1928.

M. J. WILCOX 1,655,001

TIRE PATCH

Filed Sept. 7, 1926

2 Sheets-Sheet 1

Martin J. Wilcox
Inventor

By Clarence A. O'Brien
Attorney

Jan. 3, 1928.
M. J. WILCOX
1,655,001
TIRE PATCH
Filed Sept. 7, 1926
2 Sheets-Sheet 2
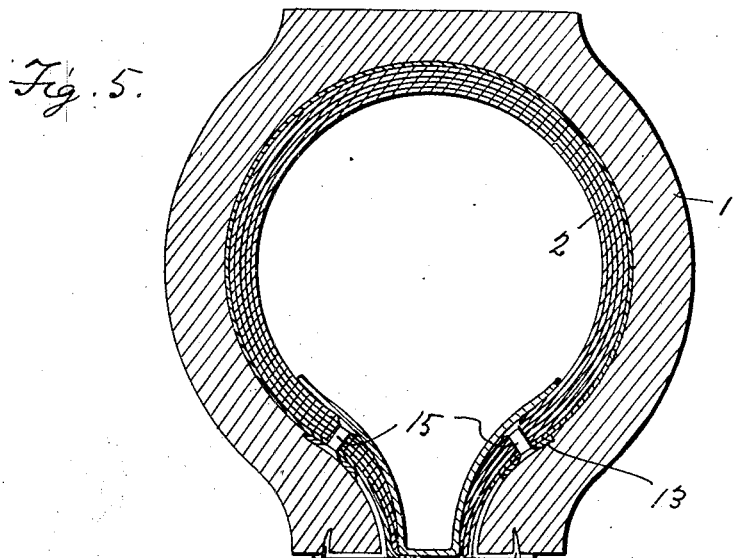
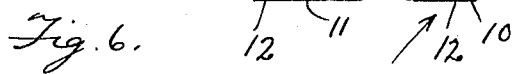
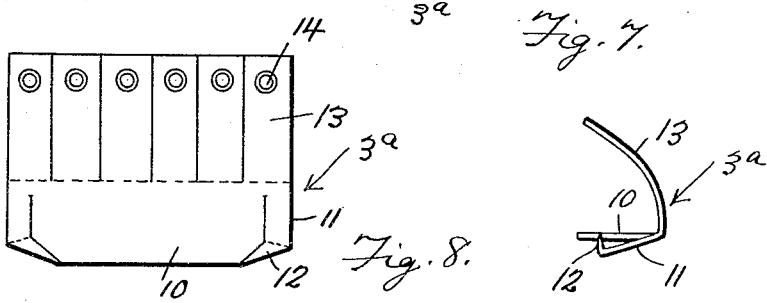
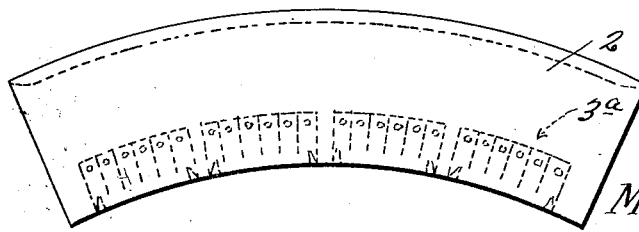
Martin J. Wilcox
Inventor
By Clarence A. O'Brien
Attorney Patented Jan. 3, 1928.

1,655,001

UNITED STATES PATENT OFFICE.

MARTIN J. WILCOX, OF PORTLAND, OREGON.

TIRE PATCH.

Application filed September 7, 1926. Serial No. 133,977.

This invention relates to a tire patch and it has more particular relation to what is known as a blow-out boot or patch for pneumatic automobile tires.

The novelty of the invention does not reside so much in the patch per se, but rather in special metallic fastening devices which are employed for securely maintaining the patch in position in the tire casing.

My principal aim is to provide a simple and inexpensive fastening device which is such in construction as to permit it to be readily secured to the patch and the tire casing.

Figure 2:
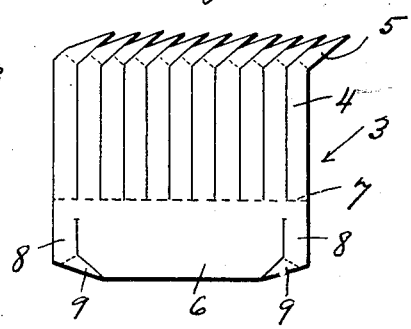
Figure 3:
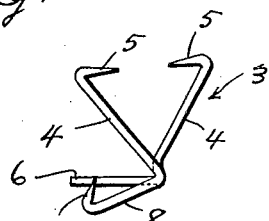

Other features and advantages of the invention will become apparent from the following description and drawings:

In the drawings:

Figure 1 is a cross section through a clincher type of tire showing the patch and retaining means, Fig. 2 is a top plan view of the metal stamping from which the fastening device is made, Fig. 3 is an end view of the fastening device made up ready for use, the same being more particularly adapted for use on the clincher type of tire.

Figure 4:
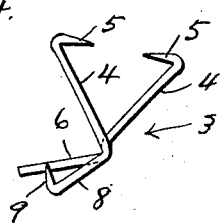
Figure 9:
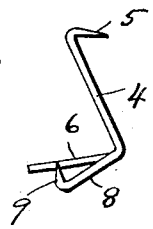

Fig. 4 is a view like Fig. 3 showing a slightly modified form adapted for use with the straight side tire, Fig. 5 is a view like Fig. 1 showing a modified form of fastening device secured in place by rivets, Fig. 6 is a plan view of the metal stamping from which this particular form of device is made, Fig. 7 is an end view of the same, ready for use, Fig. 8 is a view showing the approximate manner in which a plurality of the fastening devices cooperate with the boot, Fig. 9 is an end view of the structure seen in Fig. 3 wherein the anchoring hooks are all disposed in the same direction.

In the drawings, it will be seen that the reference characters 1 designate the tire casing and the reference character 2 represents the removable shoe or boot 2 which is preferably of laminated construction. The reference character 3 designates a rim protector of more or less conventional form.

As before stated, the novelty resides in the particular construction of the metallic fastening devices for the patch.

Considering Figs. 2 to 4 inclusive, it will be seen that this device is in the form of a substantially rectangular metal plate which is slit transversely at longitudinally spaced points to provide a multiplicity of retaining fingers 4. It will be noticed that the stamping is so cut at the ends of the fingers as to provide points 5 which may be bent to provide retaining hooks. The portion 6 of the plate which is substantially solid and which is adapted to be folded on the dotted line 7 constitutes a flange. It will be noted that at the ends of this flange supplemental tongues 8 are provided and these are in turn formed with points 9 adapted to form retaining hooks. As shown in Fig. 3, the flange 6 is disposed at right angles to the fingers 4 and the hooks 5 are disposed inwardly towards each other and at right angles to the body portion of the fingers. The tongues 8 are bent at acute angles to the flange 6 and at obtuse angles to the fingers 4. Moreover, the fingers are bent alternately in a manner to dispose them in outwardly diverging relation, thus allowing the edge portion of the flexible boot to be disposed therebetween and to permit the oppositely extending hooks to be pressed into the fabric to securely fasten the fingers thereto. Then, the flange 6 is placed against the bottom of the bead of the tire and the hooks 9 on the tongues 8 are embedded in these beads, thus securely holding the boot in place in the car casing. Here, it might be stated that the only distinction between Figs. 3 and 4 is that in Figure 4 the tongues 8 are preferably slightly shorter in length and that the parts are bent at different angles to permit them to more effectively accommodate a flat side tire casing. It may also be stated here that it is not necessary that the arms 4 be disposed in diverging relation, but they may all be disposed in substantially the same plane as represented in Fig. 9 and all of the hooks 5 turned in the same direction, thus permitting fastening on the outside of the boot only. Otherwise, this figure is the same as Figs. 3 and 4. In addition, attention is directed to Fig. 8 at this time wherein it will be seen that the patch may be of elongated formation and a plurality of the retaining devices $3^a$ employed in connection therewith as shown in dotted lines.

Directing attention now to Figs 5, 6 and 7 it will be seen that the retaining devices $3^a$ are represented by the reference character $3^a$. Here, again, each device is in the form of a metal plate including a solid edge portion 10 forming a flange, this being slit at its opposite ends to provide retaining tongues 11 having fastening hooks 12. The fingers 13 are slightly wider than the aforesaid fingers 4 and instead of being provided with hooks, are provided with holes 14 for passage of retaining rivets 15. In this form of the invention the fingers are riveted to the end portions of the patch as shown plainly in Fig. 5, while the flange 10 is directed outwardly at right angles to rest against the tire casing. Moreover, the tongues 11 and hooks 12 are fastened in the manner already described.

It is believed that by considering the description in connection with the drawings, a clear understanding of the invention will be had. Therefore, a more lengthy description is thought unnecessary.

While the preferred embodiments of the invention have been shown and described, it is to be understood that minor charges coming within the field of invention claimed may be resorted to if desired.

I claim:

1. A tire patch retaining device comprising a body provided with a flange, hooked retaining tongues associated with the end portions of the flange, and a portion provided with means whereby it may be secured to the edge portions of the patch.

2. In a retaining device of the class described, a stamped metal plate provided along one edge with a flange-forming portion and having its opposite edge transversely slit at longitudinally spaced points to provide a multiplicity of individual retaining fingers, portions of the plate at the ends of the flange-forming portion being slit and pointed to provide supplemental fastening tongues.

In testimony whereof I affix my signature.

MARTIN J. WILCOX.